United States Patent
Pham et al.

(10) Patent No.: US 11,687,072 B2
(45) Date of Patent: Jun. 27, 2023

(54) AUTOMATIC UAV LANDING PAD

(71) Applicant: Honeywell International Inc., Morris Plains, NJ (US)

(72) Inventors: Hai Pham, Eden Prairie, MN (US); Saul Cooper, Fridley, MN (US); Mark Finney, Wayzata, MN (US); Arjun BJ, Golden Valley, MN (US)

(73) Assignee: Honeywell International Inc., Charlotte, NC (US)

( * ) Notice: Subject to any disclaimer, the term of this patent is extended or adjusted under 35 U.S.C. 154(b) by 442 days.

(21) Appl. No.: 16/870,719

(22) Filed: May 8, 2020

(65) Prior Publication Data

US 2021/0349456 A1 Nov. 11, 2021

(51) Int. Cl.
| | |
|---|---|
| *G05D 1/00* | (2006.01) |
| *B64C 39/02* | (2023.01) |
| *B64C 1/36* | (2006.01) |
| *G05D 1/02* | (2020.01) |
| *B64F 1/36* | (2017.01) |
| *B64U 10/13* | (2023.01) |

(52) U.S. Cl.
CPC .............. *G05D 1/0011* (2013.01); *B64C 1/36* (2013.01); *B64C 39/024* (2013.01); *B64F 1/36* (2013.01); *G05D 1/0276* (2013.01); *B64U 10/13* (2023.01); *B64U 2201/104* (2023.01)

(58) Field of Classification Search
None
See application file for complete search history.

(56) References Cited

U.S. PATENT DOCUMENTS

| | | | |
|---|---|---|---|
| 9,274,529 B2 | 3/2016 | Ben-Shachar et al. | |
| 9,836,047 B2 | 12/2017 | Clark et al. | |
| 9,851,724 B2 | 12/2017 | Bianchi et al. | |
| 10,044,465 B1 | 8/2018 | Hetsko et al. | |
| 10,061,328 B2 | 8/2018 | Canoy et al. | |
| 10,175,699 B2 | 1/2019 | Chiodini et al. | |
| 10,345,441 B2 | 7/2019 | Batra et al. | |
| 2017/0069214 A1 | 3/2017 | Dupray et al. | |
| 2018/0025651 A1* | 1/2018 | Anderson | G08G 5/0039 701/2 |

(Continued)

FOREIGN PATENT DOCUMENTS

| | | |
|---|---|---|
| EP | 3415427 A1 | 12/2018 |
| TW | 200809245 * | 2/2008 |

OTHER PUBLICATIONS

Kang, TW200809245A-IP66-Translation, 2008 (Year: 2008).*

(Continued)

*Primary Examiner* — Yuen Wong
*Assistant Examiner* — Hongye Liang
(74) *Attorney, Agent, or Firm* — Shumaker & Sieffert, P.A.

(57) ABSTRACT

An unmanned aerial vehicle (UAV) navigation system includes a portable, ground-based landing pad comprising having a first antenna configured to transmit a data packet; a UAV comprising a second antenna configured to receive the data packet; and second processing circuitry configured to determine a signal strength between the first antenna and the second antenna; determine, based on the signal strength, an orientation of the vehicle relative to the landing pad; and determine, based on a time of flight of the data packet, a distance between the vehicle and the landing pad.

18 Claims, 6 Drawing Sheets

(56) References Cited

U.S. PATENT DOCUMENTS

2018/0357910 A1* 12/2018 Hobbs .................... B64C 27/00
2019/0248487 A1   8/2019 Holtz et al.
2021/0384963 A1* 12/2021 Frost ................. H04B 7/18506
2022/0069449 A1*  3/2022 Xue ..................... H01Q 21/205

OTHER PUBLICATIONS

Alshbatat et al., "Adaptive MAC protocol for UAV communication networks using directional antennas," 2010 International Conference on Networking, Sensing and Control (ICNSC), May 2010, pp. 598-603.
Weaver et al., "UAV Performing Autonomous Landing on USV Utilizing the Robot Operating System," ASME Early Career Technical Symposium, Nov. 2013, 6 pp.
Fudge et al., "Adaptive Distributed Sensing for Emitter Localization with Autonomous UAV Team Cooperation," Proc. of Application-specific Systems, Architectures and Processors (ASAP), 2007, 6 pp.
Williams et al., "Intelligent Landing System for Landing UAVS at Unsurbeyed Airfields," 28th International Congress of the Aeornautical Sciences (ICAS), Sep. 2012, pp. 1-19.

* cited by examiner

AUTOMATIC UAV LANDING PAD

TECHNICAL FIELD

This disclosure relates to unmanned aerial vehicles (UAVs).

BACKGROUND

A human pilot may manually remotely control an unmanned aerial vehicle (UAV). In some examples, a UAV may include one or more onboard navigation systems in order to automatically conduct semi-autonomous or fully autonomous flight segments. For example, a UAV may include a GPS-based navigation system or a visual-based (e.g., image-processing-based) navigation system.

SUMMARY

In general, this disclosure relates to systems and techniques for automatically guiding or navigating a UAV to a desired location. The techniques of this disclosure may be used as a primary UAV navigation system, or a backup navigation system, such as when the UAV's conventional navigation systems become compromised. In some examples, a system includes a portable "smart" landing pad, configured to broadcast a signal from an omnidirectional antenna embedded within the landing pad. The system may also include a UAV having a directional antenna configured to detect the broadcast signal and determine, based on the relative signal strength at different orientations, a direction of origin of the broadcast signal. The system may further include a one or more processors configured to determine, based on a time of flight (ToF) of the signal between the omnidirectional antenna and the directional antenna, a distance between the landing pad and the UAV. The system may then cause the UAV to automatically navigate toward the landing pad based on the determined distance and direction of origin.

In one example, this disclosure describes an unmanned aerial vehicle (UAV) navigation system including a portable, ground-based landing pad comprising a first antenna; and first processing circuitry configured to cause the first antenna to transmit a data packet; a UAV comprising: a second antenna configured to receive the data packet; and second processing circuitry configured to: determine a signal strength between the first antenna and the second antenna; determine, based on the signal strength, an orientation of the vehicle relative to the landing pad; and determine, based on a time of flight of the data packet, a distance between the vehicle and the landing pad.

In another example, this disclosure describes a method including receiving, by a UAV from a ground-based portable landing pad, a first data packet; transmitting, by the UAV in response to receiving the first data packet, a second data packet to the landing pad; receiving, by the UAV from the landing pad, a third data packet comprising a distance between the UAV and the landing pad; and causing the UAV to navigate toward the landing pad based on the distance and an orientation of the UAV relative to the landing pad.

In another example, this disclosure describes a UAV including an antenna and processing circuitry configured to receive, from a ground-based portable landing pad, a first data packet; transmit, in response to receiving the first data packet, a second data packet to the landing pad; receive, from the landing pad, a third data packet comprising a distance between the UAV and the landing pad; and cause the UAV to navigate toward the landing pad based on the distance and an orientation of the UAV relative to the landing pad.

The details of one or more examples of the disclosure are set forth in the accompanying drawings and the description below. Other features, objects, and advantages will be apparent from the description, drawings, and claims.

DETAILED DESCRIPTION

Figure 1:
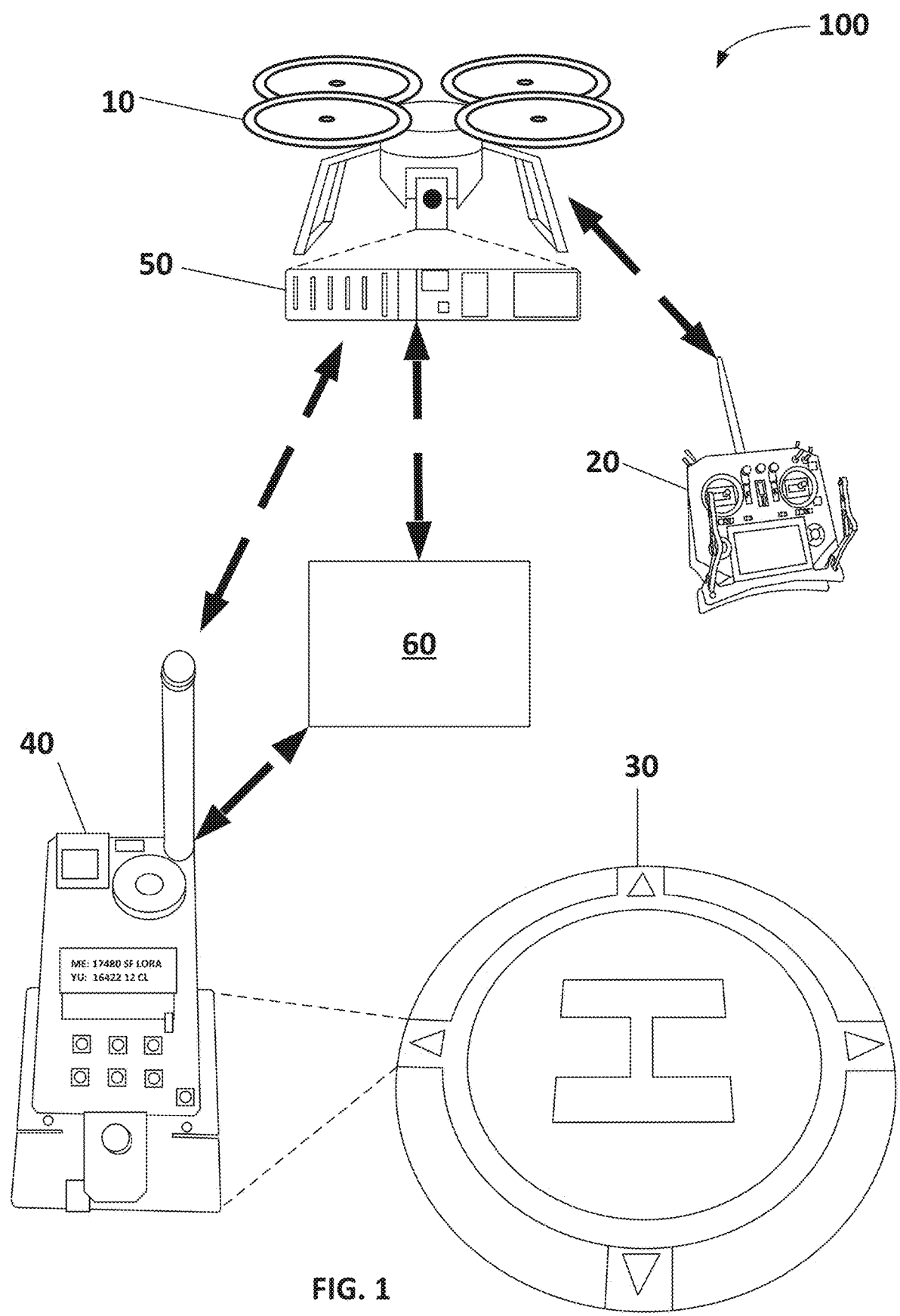
FIG. 1 is a conceptual diagram depicting an example UAV navigation system, according to one or more techniques of this disclosure.
Figure 2:
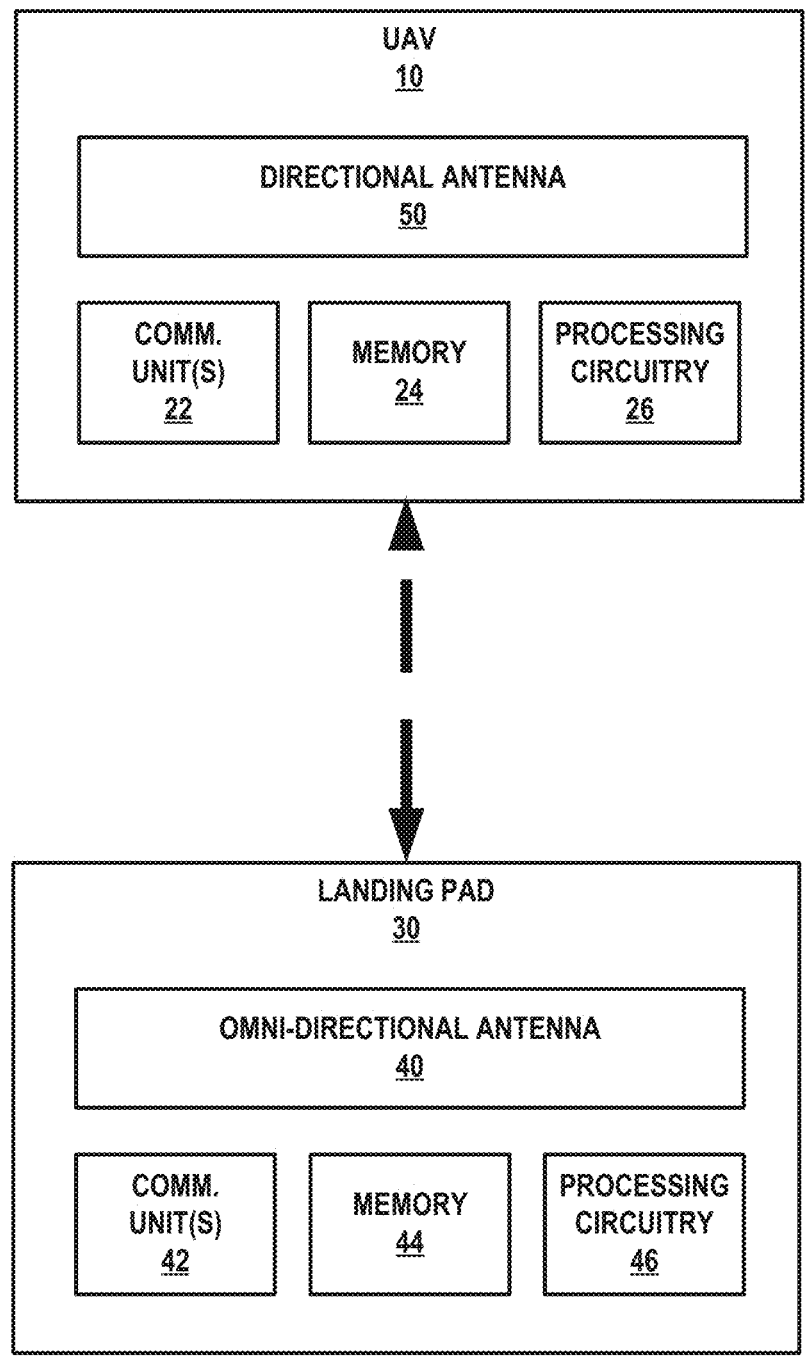
FIG. 2 is a block diagram illustrating some example components of the system of FIG. 1.

FIGS. 1 and 2 depict an example unmanned aerial vehicle (UAV) navigation system 100, according to techniques of this disclosure. System 100 may be included as part of a primary navigation system of UAV 10, or in other examples, may include a backup navigation system for use when one or more other UAV navigation system(s) become unavailable. As shown in FIG. 1, UAV navigation system 100 includes UAV 10. UAV controller 20, portable landing pad 30, omnidirectional antenna 40, directional antenna 50, and one or more computing devices 60. As shown in FIG. 2, UAV 10 includes one or more communication units 22, and a computing device (e.g., computing device 60 of FIG. 1) comprising at least a memory 24 and one or more processor(s) 26. Portable landing pad 30 includes omnidirectional antenna 40, one or more communication unit(s) 42, and a computing device (e.g., computing device 60 of FIG. 1) comprising at least a memory 44 and one or more processor(s) 46.

UAV 10 may include a relatively small unmanned device capable of flight, such as via one or more rotors. UAV 10 is depicted in FIG. 1 as a quadcopter, but UAV 10 may include any type of UAV including, but not limited to, a rotorcraft, a fixed wing aircraft, compound aircraft such as tilt-rotor, X2 and X3, an aerostat, or any other such type of UAV including all vertical take-off and landing (VTOL), tail-sitter, etc. UAV 10 may be configured to fly with various degrees of autonomy. In some examples, UAV 10 may use light-detection and ranging (LIDAR) for collision avoidance. UAV 10 may, for example, be a relatively small, low altitude, and low-speed UAV, where in this context, small corresponds to under 100 lbs. (e.g., around 50 lbs.), low altitude corresponds to operating altitudes less than 3000 feet above ground (e.g., 400 feet or less), and low air speed corresponds to air speeds less than 250 knots (e.g., 10 knots) or less than 50 miles per hour (mph). Furthermore, it is contemplated that UAV 10 may have hovering capabilities, meaning UAV 10 may have the capability of remaining at an approximately constant location in the air. Although FIG. 1 depicts system 100 including a flight-capable UAV 10, in other examples, the techniques of this disclosure may be performed with other vehicles, such as ground-based vehicles or aquatic vehicles.

In some examples, a detector or other sensing equipment may be mounted on UAV 10, due to the UAV's ability to quickly collect high-quality data in hard-to-reach locations. For example, large-scale industrial companies, such as utilities, oil, and natural gas, may own or otherwise manage a complex asset infrastructure, such as transmission towers for an electric powerline, pipelines, data (fiber-optic) cables, factories, plants, solar panels, wind turbines, or other structures or facilities. Such infrastructure may require periodic inspections to maintain high productivity. The overseeing company (or other controlling entity, such as a governmental administrative body) may employ any of a number of different types of sensing or detection equipment to collect various types of data describing different aspects of the infrastructure. Some non-limiting examples of current sensing equipment include x-ray systems, infrared systems, sonar systems, radar detectors, optical systems, and hybrid multispectral cameras. In other examples, UAV 10 may include unmanned delivery vehicles, such as described in the example of FIG. 5, below.

In some examples, a human or other pilot may manually control a flight path (e.g., speed, heading or direction, altitude, etc.) of UAV 10 via remote radio controller 20. For example, controller 20 may configured to wirelessly transmit signals to communication units 22 of UAV 10 to control the UAV's flight path, such as during an inspection flight segment. Additionally or alternatively, UAV 10 may include one or more internal navigation systems configured to enable UAV 10 to autonomously or semi-autonomously complete one or more flight segments. For example, UAV 10 may include a satellite-based navigation system, such as a Global Positioning System (GPS)-based navigation. In some examples, UAV 10 may include a visual-based navigation system, wherein the UAV includes an image-capture device and one or more processors configured to identify landmarks from within captured imagery and determine a flightpath based on the landmarks. In some examples, UAV 10 may include a passive-surveillance-based navigation system, such as Automatic Dependent Surveillance Broadcast (ADS-B).

In some scenarios, the one or more of the navigation system(s) of UAV 10 may be unavailable or malfunctioning. For example, due to weather, equipment malfunction, terrain, or other factors, UAV 10 may lose data communication with ground-based controller 20, and/or other signals from additional navigation systems, such as a GPS signal. In one scenario, a set of infrastructure undergoing a UAV-based inspection may naturally emit a relatively strong electromagnetic signature that can interfere with a vehicle's detection equipment and/or guidance systems (such as GPS, radiofrequency, or other electromagnetic-based guidance systems).

In some examples in accordance with this disclosure, upon the occurrence of a triggering condition, system 100 may be configured to cause UAV 10 to automatically navigate toward an on-demand, newly desired location. For example, an initial condition may include one or more components of system 100 automatically detecting a loss of data communication with UAV 10. In another example, a triggering condition may include one or more components of system 100 receiving a particular input indicative of the condition. For example, a user, such as a pilot of UAV, may activate a user-input device configured to trigger an automatic-landing mode of UAV 10.

In such an event or in response to detecting the condition, UAV 10 may be configured to automatically self-navigate (e.g., with minimal-to-no further human intervention) toward a desired landing location. For example, in accordance with the techniques of this disclosure, system 100 includes portable landing pad 30, configured to wirelessly interact with UAV 10. As shown in FIG. 1, portable landing pad 30 may include a relatively small, lightweight planar surface or substrate that a user, such as a human pilot of UAV 10, may place in a desired location for UAV 10 to automatically navigate toward and/or land upon. In some examples, portable landing pad 30 may be composed of a polymer, rubber, or any other flexible, waterproof material. For example, portable landing pad 30 may include a waterproof rating of at least IP66, such as IP67 or greater. Portable landing pad 30 may include an embedded battery or other power source configured to provide electrical power to one or more internal components, such as communication unit(s) 42, memory 44, and/or processing circuitry 46 (FIG. 2), configured to enable UAV 10 to automatically self-navigate toward portable landing pad 30.

For example, system 100 includes omnidirectional antenna 40, either embedded within or otherwise rigidly coupled to landing pad 30, such that omnidirectional antenna 40 and portable landing pad 30 permanently maintain a common geolocation at all times. In some examples, omnidirectional antenna 40 may include a communication device having a long-range ("LoRa") modem configured to broadcast a signal in all spatial directions and/or detect a signal from all spatial directions. For example, omnidirectional antenna 40 may include a "pinger" device configured to periodically broadcast a ping or other electromagnetic signal.

Upon detection of the triggering condition, for example, in the event that system 100 determines that UAV 10 is unable to use a primary navigation systems, omnidirectional antenna 40 is configured to begin broadcasting an electromagnetic signal in all spatial directions. In some examples, the initial electromagnetic signal from omnidirectional antenna 40 may be configured to indicate to or cause UAV 10 to enter a failsafe mode (e.g., an automatic landing mode or return-toward-base mode). Additionally or alternatively, the broadcast signal may include data encoding an identification number for the particular landing pad 30 (e.g., the particular omnidirectional antenna 40) that is broadcasting the signal, such that UAV 10 may distinguish the source in the event that more than one signal of this type is being broadcast in the area. Additionally or alternatively, the broadcast signal may encode a timestamp indicating a relatively precise moment at which omnidirectional antenna 40 broadcasted the signal. In some examples, omnidirectional antenna 40 may be configured to broadcast a single initial signal upon detecting the event or condition. In other examples, omnidirectional antenna 40 may periodically broadcast the initial signal, such as at a frequency of once every second, five times per second, or any other frequency.

In some examples in accordance with this disclosure, system 100 includes a directional antenna 50 configured to detect (e.g., receive) the signal broadcast by omnidirectional antenna 40. In some examples, directional antenna 50 may be part of a relatively lightweight (e.g., small footprint) communication device implemented on or coupled to a printed circuit board (e.g., one of computing devices 60). Directional antenna 50 includes a high-gain antenna configured to broadcast and/or receive a signal from only one spatial direction at a time, or from a narrow band of spatial directions. For example, directional antenna 50 may include a phased array of multiple (e.g., two or more) closely-spaced linear communication elements, such as half-wave dipoles, oriented parallel to one another. One non-limiting example of directional antenna is a "Yagi-Uda" antenna.

Directional antenna 50 may be coupled to UAV 10 or incorporated into the main body of UAV 10, such that a forward direction of directional antenna 50 is aligned with the heading orientation of UAV 10. In other words, directional antenna 50 may be mounted to UAV 10 such that directional antenna receives a highest broadcast-signal strength from landing pad 30 when UAV 10 is oriented toward (e.g., in a special direction of) landing pad 30.

In some examples, upon detecting the signal broadcast by omnidirectional antenna 40, UAV 10 may initiate or enter a failsafe mode, such as an emergency-landing mode of operation. For example, in the failsafe mode, processing circuitry 26 of UAV 10 may cause directional antenna 50 to revolve or rotate in order to determine a cardinal direction from which the signal originated. In some examples, directional antenna 50 may be rotatably coupled to UAV 10, such that directional antenna 50 may individually rotate to determine a direction of origin from which the broadcast signal strength is the strongest. In other examples, directional antenna 50 may be rigidly coupled to UAV 10, such that the fixed combination of UAV 10 and directional antenna 50 may be configured to rotate or revolve in space around a vertical "yaw" axis of rotation, for example, with respect to the ground, in order to determine a direction of origin from which the signal strength is the strongest. In some examples, directional antenna 50 may complete a 360° rotation in order to determine a single cardinal direction or confined range of cardinal directions having the strongest signal strength. For example, throughout the complete rotation. UAV 10 may store in memory 24 an indication of the relative signal strength associated with each cardinal direction. After the rotation is complete, UAV 10 may identify the cardinal direction having the strongest signal strength, and cause itself and/or directional antenna 50 to orient toward that direction. In other examples, directional antenna 50 may rotate until detecting a "local maximum" of signal strength, after which the signal strength begins to decrease, at which point directional antenna 50 and/or UAV 10 re-orients toward the direction of the local maximum.

In addition to rotating about the cardinal directions North, South, East, and West (e.g., rotating with respect to the ground), in some examples, directional antenna 50 (or the fixed combination of UAV 10 and directional antenna 50) may be configured to nutate (e.g., periodically rock or sway) with respect to its altitude. For example, UAV 10 may tilt up and down around a horizontal "pitch" axis of rotation in order to determine an angle of elevation exhibiting the greatest signal strength between directional antenna 50 and omnidirectional antenna 40. In some examples, UAV 10 may include an inertial measurement unit (IMU) configured to determine an angle of elevation (e.g., an orientation with respect to Earth's gravity) associated with each received signal strength indication (RSSI).

In some examples, but not all examples, system 100 may include one or more computing devices 60, having at least a memory and one or more processors. In some examples, computing device 60 may be communicatively coupled to omnidirectional antenna 40, for example, memory 44 and processing circuitry 46 embedded within landing pad 30. Additionally or alternatively, computing device 60 may be communicatively coupled to directional antenna 50, for example, memory 24 and processing circuitry 26 of UAV 10. Additionally or alternatively, computing device 60 may be housed within a ground-based communication station, such as a control tower. In some examples, computing device 60 may include a portable computing device, such as a smartphone, laptop, tablet, or the like, operated by the UAV pilot, such as controller 20.

In examples in which both UAV 10 and landing pad 30 include a computing device (e.g., processing circuitry), the UAV 10 and landing pad 30 (and their respective computing devices) may be defined by a master-minion relationship. A "master" device is defined in that it controls a clock of system 100. Accordingly, timestamps generated by a "minion" device must be synchronized to the clock of the master device. In some examples, landing pad 30 may be the master device, and UAV 10 may be a minion device. In other examples, UAV 10 may be the master device, and landing pad 30 be a minion device.

In some examples in accordance with this disclosure, any or all of computing devices 60 may include a ranging engine ranging configured to determine, based on a time-of-flight (ToF) of a signal broadcast between two transceiver radios (e.g., between omnidirectional antenna 40 and directional antenna 50), an approximate distance between UAV 10 and landing pad 30. For example, computing device 60 may be coupled to UAV 10 and directional antenna 50, and compare a timestamp contained within a broadcast signal from omnidirectional antenna 40 to a timestamp generated at the time at which the signal was received, in order to determine a total travel time of the broadcast signal between the two antennae 40, 50. Based on the travel time, computing device 60 may determine an approximate distance between UAV 10 and portable landing pad 30 by multiplying the ToF of the signal by the velocity of an electromagnetic signal (e.g., the speed of light). In some examples, computing device 60 may incorporate a predetermined calibration (e.g., offset) value into the distance calculation, in order to account for an amount required to generate the timestamps and/or otherwise process the signals.

In another example, computing device 60 may be coupled to embedded within portable landing pad 30 and communicatively coupled to omnidirectional antenna 40. In such examples, computing device 60 may be configured to determine a total round-trip ToF of a broadcast signal from omnidirectional antenna 40 combined with an automatic reply signal from directional antenna 50 in order to determine the approximate distance between UAV 10 and landing pad 30. Upon determining an approximate distance between UAV 10 and landing pad 30, computing device 60 may be configured to cause omnidirectional antenna 40 to transmit an indication of the calculated distance back to directional antenna 50 and UAV 10.

Based on the determined direction of origin from the relative signal strength of the broadcast signal, and based on the determined distance between UAV 10 and landing pad 30 from the signal ToF, UAV 10 may be configured to automatically self-navigate toward landing pad 30. As UAV 10 approaches portable landing pad 30, omnidirectional antenna 40 and/or directional antenna 50 may continue periodically broadcasting signals toward each other such that UAV 10 may determine whether it is on the correct course toward landing pad 30, and if not, may automatically adjust or correct its course until it has reached landing pad 30. In some examples, UAV 10 may include a secondary navigation system, such as a visual-based navigation system, to bolster or "confirm" the trajectory of UAV 10 as it navigates toward the landing site. In other examples, such as when system 100 and a visual-based navigation system conflict (e.g., about a distance, direction, or location of UAV 10), the visual-based navigation system may be configured to "override" navigation system 100. For example, a visual-based navigation system may visually identify an obstacle in the flightpath of UAV 10 that system 100 may not. In such cases, UAV 10 may be configured to circumvent the obstacle via the visual-based navigation system, and resume navigation via system 100 afterward. In other examples, navigation system 100 and a visual-based navigation system may each maintain a relative "confidence rating," for example, indicating a confidence in location, direction, etc. based for example on signal strengths, successful pattern recognition, or other indicators. In other examples, UAV 10 may navigate a majority of the distance to landing pad 30 using navigation system 100, and then switch over to a visual-based navigation system to perform the actual landing mechanism.

It is to be understood that the example of system 100 depicted in FIG. 1 is not intended to be limiting. Other systems in accordance with the techniques of this disclosure may include more, fewer, or different components than those depicted in FIG. 1. For example, in some examples of system 100, omnidirectional antenna 40 may be coupled to UAV 10 instead of portable landing pad 30, and directional antenna 50 may be coupled to portable landing pad 30 instead of UAV 10. For example, processing circuitry 26 of UAV 10 may be configured to determine that UAV 10 has lost functionality of its primary navigation system(s), such as GPS, and automatically enter an emergency-landing mode of operation, such as by causing omnidirectional antenna 40 to begin broadcasting a distress signal. Directional antenna 50, coupled to portable landing pad 30, may rotate to determine a direction of origin having the greatest signal strength, and then may "respond" to omnidirectional antenna 40 with a reply signal indicating the determined direction of origin and/or a calculated ToF of the broadcast signal. Based on the determined direction of origin from the relative signal strength of the broadcast signal, and based on the determined distance between UAV 10 and landing pad 30 from the signal ToF. UAV 10 may be configured to automatically self-navigate toward landing pad 30.

In some examples, system 100 may include two or more landing pads 30. In such examples, the UAV pilot may transmit a signal (e.g., via controller 20 or omnidirectional antenna 40) indicating an identifier (e.g., an identification number) of a particular landing pad on which to land. In other examples, UAV 10 may be configured to automatically select one of landing pads 30 on which to land, such as by determining a distance to all nearby landing pads 30 and then selecting the closest pad.

Communication units 42 of landing pad 30 may include any devices configured to transmit and receive data associated with system 100. For example, communication units 42 may be configured to receive a last-known location, orientation, speed, and/or direction of UAV 10. Communication units 42 may additionally or alternatively be configured to receive weather data or other data enabling system 100 (e.g., processors 26, 46) to predict a loss of communication with, or services of, UAV 10. Memory 44 of landing pad 30 may be configured to store any data received by communication units 42 or generated by processors 26, 46.

In some instances, landing pads 30 and/or UAV 10 may be configured to use a signal strength of the broadcast signal received from landing pad 30 and the determined distance to verify the accuracy of the navigation. That is, as the distance between landing pad 30 and UAV 10 decreases, the signal strength of the broadcast signal detected by UAV 10 should increase. If UAV 10 determines that this relationship is not holding true, then UAV 10 may, for example, recalibrate by repeating the process described above for determining an orientation.

It should be understood that although the techniques of this disclosure are being described with respect to a landing pad, the functionality attributed to the landing pad may also be incorporated into devices with other form factors. Moreover, for ease of explanation, the techniques of this disclosure are being described with respect to automatic landing, but the techniques generally apply to any automatic navigation of a vehicle towards a target. Such automatic navigation does not necessarily need to include an actual landing even or even be for the purpose of landing.

Figure 3:
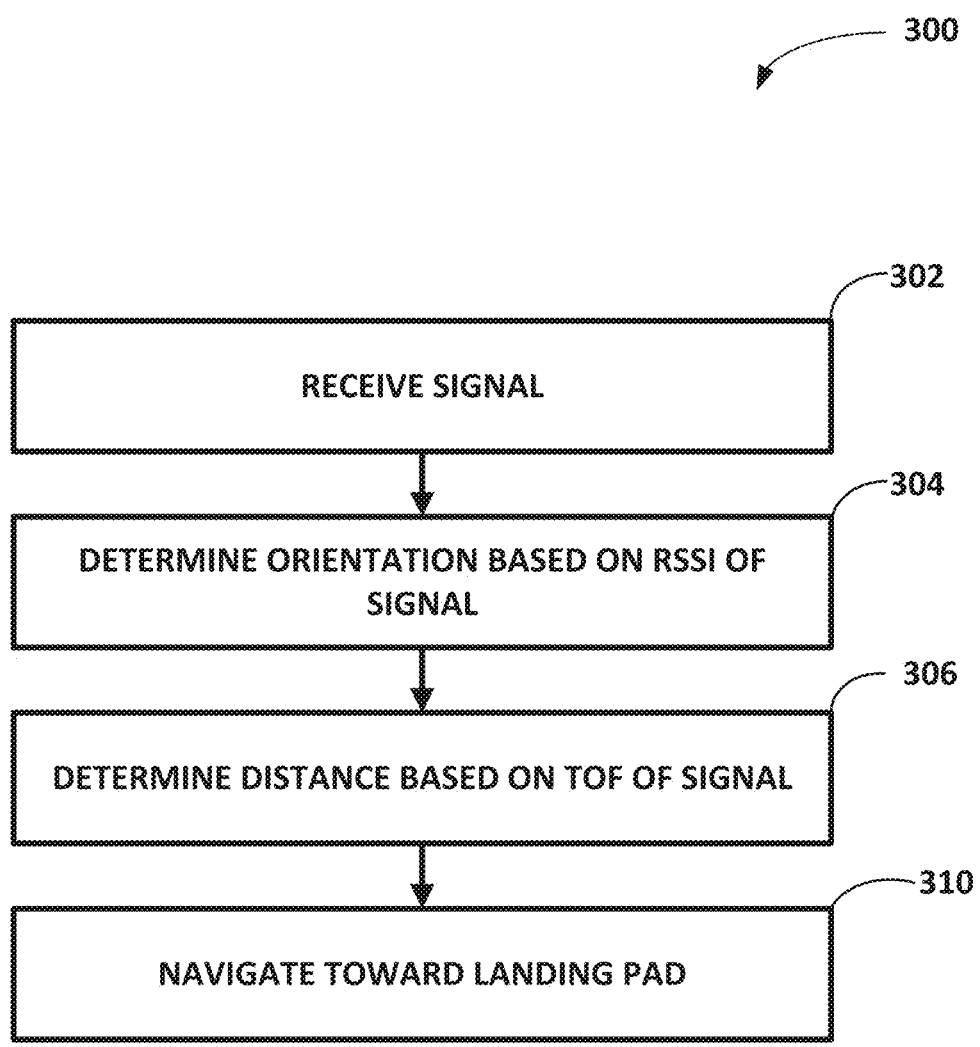
FIG. 3 is a flowchart illustrating an example operation, in accordance with a technique of this disclosure.

FIG. 3 is a flowchart illustrating an example operation 300 in accordance with techniques of this disclosure. Operation 300 is described with respect to UAV 10 and landing pad 30 of system 100 of FIG. 1, however, the techniques may be performed by any appropriate system.

A directional antenna 50 coupled to a UAV 10 receives or detects a broadcast signal (302). For example, UAV 10 may receive the broadcast signal from an omnidirectional antenna 40 embedded within a portable landing pad 30. The broadcast signal may include, for example, a UAV-emergency-land command and a timestamp indicating the time at which omnidirectional antenna 40 broadcast the signal.

In response to detecting the signal, directional antenna 50 may be configured to pan, rotate, or revolve in order to determine an orientation at which the received signal strength is the strongest (304). For example, directional antenna 50 may rotate with respect to the UAV 10 to which it is coupled. In another example, directional antenna 50 is rigidly coupled to UAV 10, such that the combined unit is configured to rotate to measure the received signal strength indication (RSSI).

Based on a "transmitted" timestamp encoded within the received signal, as well as a "received" timestamp generated by UAV 10 when directional antenna 50 detects the received signal, UAV 10 determines a time-of-flight (ToF) of the broadcast signal as the time difference between the transmitted timestamp and the received timestamp (306). Based on the ToF, UAV 10 may determine an approximate distance between landing pad 30 and UAV 10, such as by multiplying the ToF by the speed of light. In response to determining both the direction of origin of the broadcast signal and the approximate distance that the signal travelled, UAV 10 may be configured to automatically self-navigate toward landing pad 30 based on the determined orientation and distance (310). In some examples, UAV 10 (e.g., directional antenna 50) may transmit the determined distance (e.g., encoded within a second signal) back toward an omnidirectional antenna 40 coupled to landing pad 30, such that landing pad 30 (e.g., processing circuitry coupled to omnidirectional antenna 40) may perform another ToF and/or distance calculation and compare the new calculation to the previous distance calculation for verification and/or error detection.

Figure 4A:
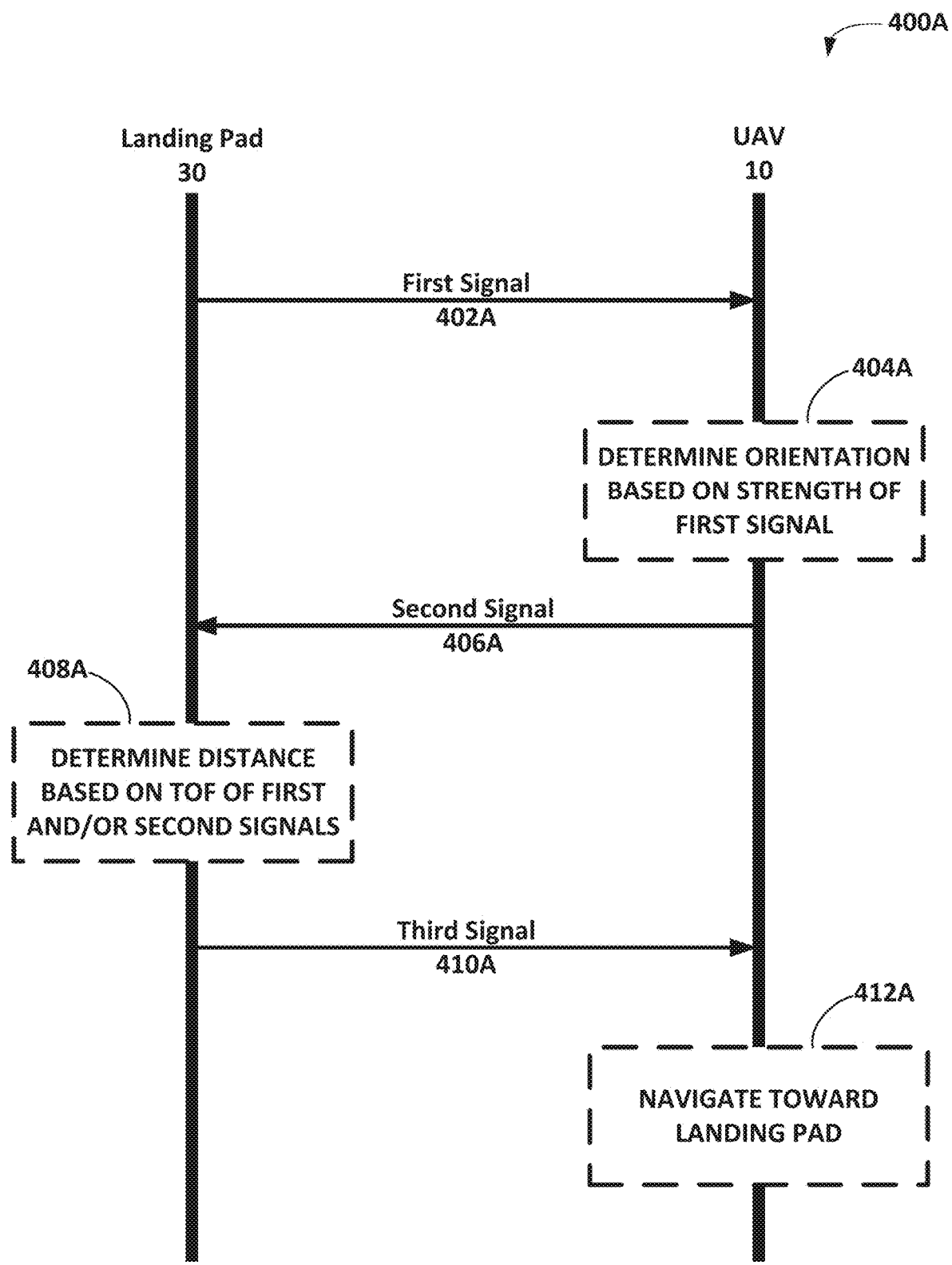
FIGS. 4A and 4B are a flowcharts illustrating example operations in accordance with a technique of this disclosure.

FIG. 4A is a flowchart illustrating an example operation 400A in accordance with techniques of this disclosure. The steps of operation 400A are described with respect to UAV 10 and landing pad 30 of system 100 of FIG. 1, however, the techniques may be performed by any capable system.

A portable UAV landing pad 30 having an incorporated omnidirectional antenna 40 may be configured to transmit a first signal (402A) in a multitude of spatial directions, such as in a circular, spherical, or semi-spherical pattern. In some instances, landing pad 30 may be configured to transmit first signal 402A in response to an initial condition. For example, the initial condition may include a user actuating a user-input device. In another example, the initial condition may include a loss of data communication between a UAV 10 and another device, such as a ground-based controller device 20, a GPS navigation system, or another device. In another example, the initial condition may include the degradation of visual conditions (e.g., loss of daylight), such as when UAV 10 primarily or partially relies on a visual-based navigation system. In another example, the initial condition may include the reduction of signal strength of wireless communications, including GPS signal, in response to an attenuation of air quality such as an increase in humidity, cloud cover, or precipitation (e.g., rain or snow). In other instances, signal 402A may represent a periodic ping. UAV 10 can effectively ignore the periodic ping until a specific condition causes UAV 10 to initiate an automatic landing protocol.

In some examples, the broadcast signal may include an encoded data packet that includes a first timestamp indicating the time at which omnidirectional antenna 40 broadcast the data packet and/or a unique identifier for the particular landing pad 30. In some examples, the first signal includes a single broadcast pulse or limited number of broadcast pulses. In other examples, the first signal includes a periodically repeated signal transmission, for example, an identical signal transmitted between 80 and 100 times, at a frequency on the order of about ten transmissions per second. In some examples, the first signal encodes or otherwise represents a "force-to-land" command, configured to cause a UAV 10 to initiate an automatic landing protocol.

In some examples, a directional antenna 50 coupled to UAV 10 is configured to receive the first signal from omnidirectional antenna 40 embedded within portable landing pad 30. Upon receiving the first signal, UAV 10 may be configured to pan or revolve in order to determine a direction at which the relative strength (e.g., amplitude or power) of the received signal is the strongest (404A). In some angles, UAV 10 may be configured to revolve in a horizontal (e.g., cardinal) direction, as well as tilt or angle itself along a vertical angle with respect to the ground. In some examples, UAV 10 may include an inertial measurement unit (IMU) configured to indicate the vertical angle toward landing pad 30 with respect to the ground. Upon determining the direction of the strongest signal (e.g., the direction from which landing pad 30 transmitted the signal), UAV 10 may be configured to orient itself along the determined direction (e.g., toward portable landing pad 30).

In some examples, UAV 10 is configured to transmit a second signal in the direction of landing pad 30 (406A). For example, UAV 10 may transmit a signal encoding a second data packet, including a "search" command along with the unique identifier or address of a particular portable landing pad 30 on which UAV 10 is seeking to land. The second data packet may also include a second time stamp indicating the time at which UAV 10 received the first signal and/or a third timestamp indicating the time at which UAV 10 transmitted the second signal. In some examples, the sought-after landing pad 30 may be the same landing pad as the pad that transmitted the first signal 402A. In other examples, the sought-after landing pad 30 may be a different pad from the pad that transmitted the first signal 402A. For example, UAV 10 may broadcast a search command directed to all landing pads 30 known to be in the area, in order to determine a most-proximal landing pad.

Once landing pad 30 receives the search command that is addressed to it, landing pad 30 (e.g., a computing device 60 having a ranging engine) may generate a set of ranging data. For example, landing pad 30 may determine, based on the first timestamp, the second timestamp, the third timestamp, and/or a fourth timestamp indicative of the time at which landing pad 30 detected the second signal, a time-of-flight (ToF) 408A of the second data packet. For example, the ranging engine may determine the ToF based on the travel time of the first signal alone, based on the second signal alone, or based on a round-trip travel time of the combined first and second signals. In some examples, but not all examples, landing pad 30 may process the ranging data to convert the received ranging data to standard distance units (e.g., feet or meters), for example, by multiplying the ToF by the speed of light. Landing pad 30 may output an indication of the distance units, such as for display on controller 20 or other display device. Landing pad 30 may then transmit a third signal 410A encoding the ToF data back toward UAV 10.

In some examples, in response to receiving the third signal 410A, UAV 10 may be configured to determine an approximate altitude of UAV 10, for example, based the ranging data and the vertical angle measured by the IMU. Based on the determined ToF and the received signal strength indication (RSSI) (e.g., the direction or orientation of greatest signal strength), processing circuitry 26 may then cause UAV 10 to begin to automatically navigate toward landing pad 30 (412A). For example, UAV 10 may self-navigate in the direction of the greatest RSSI while continuously interacting with landing pad 30 to update the ToF until the determined ToF value (e.g., the determined distance between UAV 10 and landing pad 30) approaches zero (e.g., within a predetermined threshold). In other examples, processing circuitry 26 may determine a speed for UAV 10 based on the determined ToF value. For example, because a larger ToF value corresponds to a longer distance between UAV 10 and landing pad 30, processing circuitry 26 may cause UAV 10 to travel at faster speeds when detecting relatively larger ToF values than when detecting smaller ToF values. Accordingly, as the continuously updated ToF calculation approaches zero (or other predetermined threshold distance from landing pad 30), UAV 10 may slow its travel speed to zero or nearly zero.

Figure 4B:
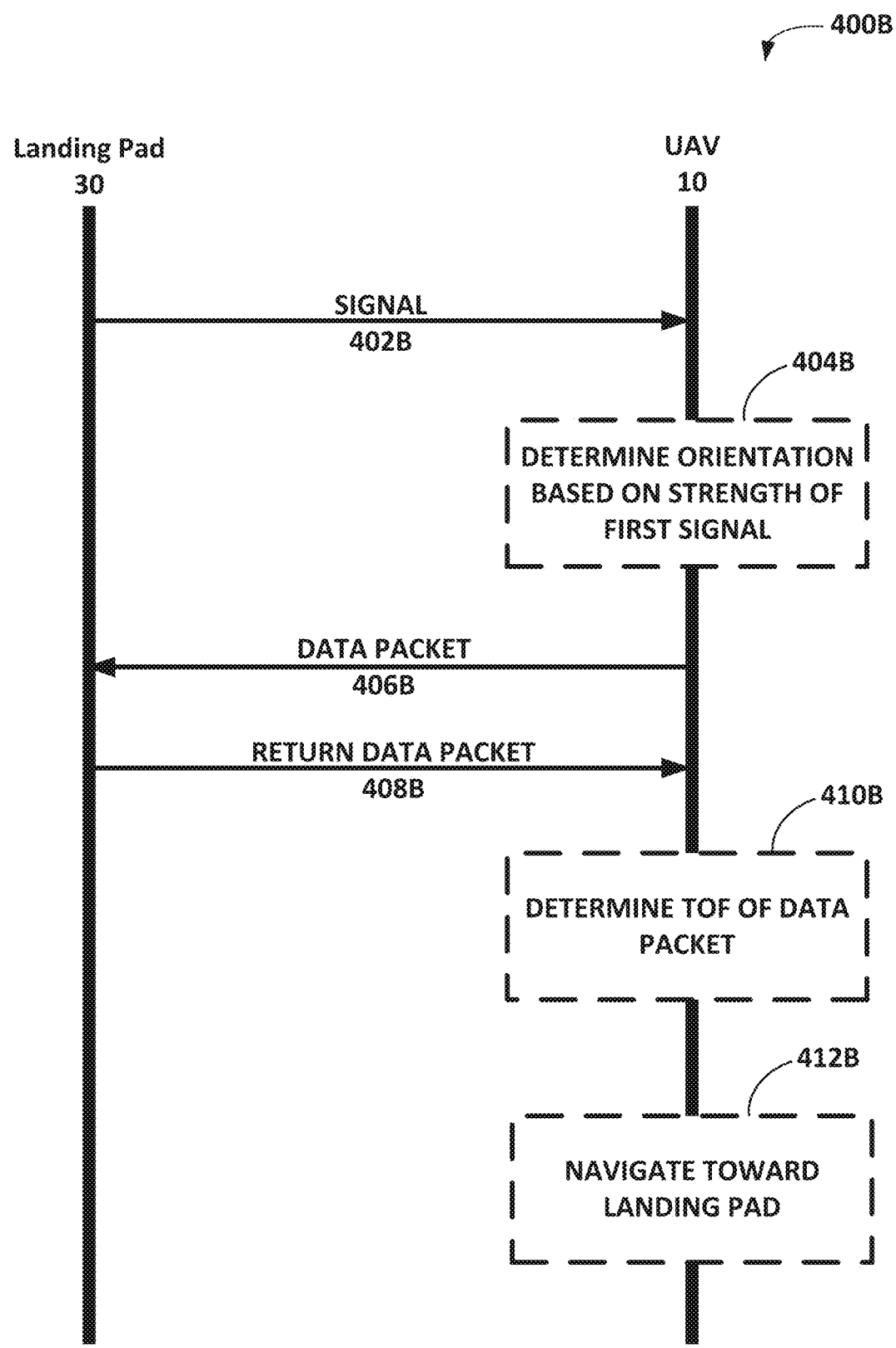

FIG. 4B is a flowchart illustrating another example operation 400B in accordance with techniques of this disclosure. The steps of operation 400B are described with respect to UAV 10 and landing pad 30 of system 100 of FIG. 1, however, the techniques may be performed by any capable system.

In response to an initial condition, a portable UAV landing pad 30 having an incorporated omnidirectional antenna 40 is configured to transmit a signal (402B) in a multitude of spatial directions, such as in a circular, spherical, or semi-spherical pattern. For example, the initial condition may include a user actuating a user-input device. In another example, the initial condition may include a loss of data communication (e.g., a radiofrequency datalink) between a UAV 10 and another device, such as a ground-based controller device 20, a GPS navigation system, or another device. In another example, the initial condition may include the degradation of visual conditions (e.g., loss of daylight), such as when UAV 10 primarily or partially relies on a visual-based navigation system.

In some examples, the broadcast signal may include an encoded data packet that includes a time stamp indicating the time at which omnidirectional antenna 40 broadcast the data packet and/or a unique identifier for the particular landing pad 30. In some examples, the first signal includes a single broadcast pulse. In other examples, the first signal includes a periodically repeated signal transmission, for example, 80 to 100 transmissions, sent at a frequency on the order of approximately ten transmissions per second. In some examples, the first signal encodes or otherwise represents a "force-to-land" command, configured to cause a UAV 10 to initiate an automatic landing protocol.

In some examples, a directional antenna 50 coupled to UAV 10 is configured to receive the first signal from omnidirectional antenna 40 embedded within portable landing pad 30. Upon receiving the first signal, UAV 10 may be configured to pan or revolve in order to determine a direction at which the relative strength (e.g., amplitude or power) of the received signal is the strongest (404B). In some angles, UAV 10 may be configured to revolve in a horizontal (e.g., cardinal) direction, as well as tilt or angle itself along a vertical angle with respect to the ground. In some examples, UAV 10 may include an inertial measurement unit (IMU) configured to indicate the vertical angle toward landing pad 30 with respect to the ground. Upon determining the direction of the strongest signal (e.g., the direction from which landing pad 30 transmitted the signal), UAV 10 may be configured to orient itself along the determined direction (e.g., toward portable landing pad 30).

In some examples, UAV 10 is configured to transmit a data packet in the direction of landing pad 30 (406B). For example, UAV 10 may transmit a "search" command along with the unique identifier or address of a particular portable landing pad 30 on which UAV 10 is seeking to land. The data packet may also include a first timestamp indicating the time at which UAV 10 transmitted the data packet. In some examples, the sought-after landing pad 30 may be the same landing pad as the pad that transmitted the signal 402. In other examples, the sought-after landing pad 30 may be a different pad from the pad that transmitted the first signal 402. For example, UAV 10 may broadcast a search command directed to all landing pads 30 known to be in the area, in order to determine a most-proximal landing pad.

Once landing pad 30 receives the search command that is addressed to it, landing pad 30 may automatically generate and broadcast a reply or return data packet 408B. The return data packet 408B may encode a timestamp at which the original data packet 406B was received, and/or another time stamp indicating a time at which the return data packet 408B was transmitted.

Upon receiving return data packet 408B, UAV 10 may generate a set of ranging data (410B). For example, UAV 10 may determine, based on the initial time stamp, the timestamp(s) encoded in the reply data packet 408B, and/or a timestamp indicating the time at which UAV 10 received return data packet 408B, a time-of-flight (ToF) 408 of the first data packet 406B and/or a round-trip ToF of first data packet 406B and return data packet 408B.

UAV 10 may process the ranging data to convert the ranging data to standard distance units (e.g., feet or meters), for example, by multiplying the ToF by the speed of light. The UAV may output an indication of the distance units, such as for display on controller 20. In some examples, UAV 10 may also be configured to determine an approximate altitude of UAV 10, for example, based the ranging data and the vertical angle measured by the IMU.

Based on the determined ToF and the received signal strength indication (RSSI), processing circuitry 26 may cause UAV 10 to begin to automatically navigate toward landing pad 30 (412B). For example, processing circuitry 26 may determine a speed for UAV 10 based on the determined ToF value. As a larger ToF value corresponds to a longer distance between UAV 10 and landing pad 30, processing circuitry 26 may cause UAV 10 to travel at faster speeds when detecting larger ToF values than when detecting smaller ToF values. One or more of the steps of operation 400B may periodically repeat such that UAV 10 regularly updates its determined distance and direction of travel.

In some instances, UAV 10 may select a landing pad from multiple available landing pads, in which case UAV 10 may perform some or all of the steps of FIGS. 4A and 4B with the multiple available landing pads. UAV 10 may then select a landing pad to navigate toward based on the signal strength determined at step 404A or 404B, the distance determined at step 408A or 410B, a priority associated with a particular landing pad, available resources of UAV 10 such as a remaining battery life, or any other such criteria or combination of criteria. As one example, if the remaining battery life of UAV 10 is below a certain threshold, then UAV 10 may be configured to select and navigate towards a closest landing pad, but if the remaining battery life of UAV 10 is above a certain threshold, then UAV 10 may be configured to select and navigate towards a highest-priority landing pad, such as one located closest to an operator of UAV 10, a landing pad located at a launch site, or a landing pad specifically identified by an operator. UAV 10 may be configured to identify the highest-priority landing pad based on some type of unique identification included in signal 402A or 402B or otherwise communicated to UAV 10. In some instances, each landing pad may transmit to UAV 10 condition data, such as weather data, wind speed data, or other relevant data for enabling UAV 10 to select a landing pad.

Figure 5:
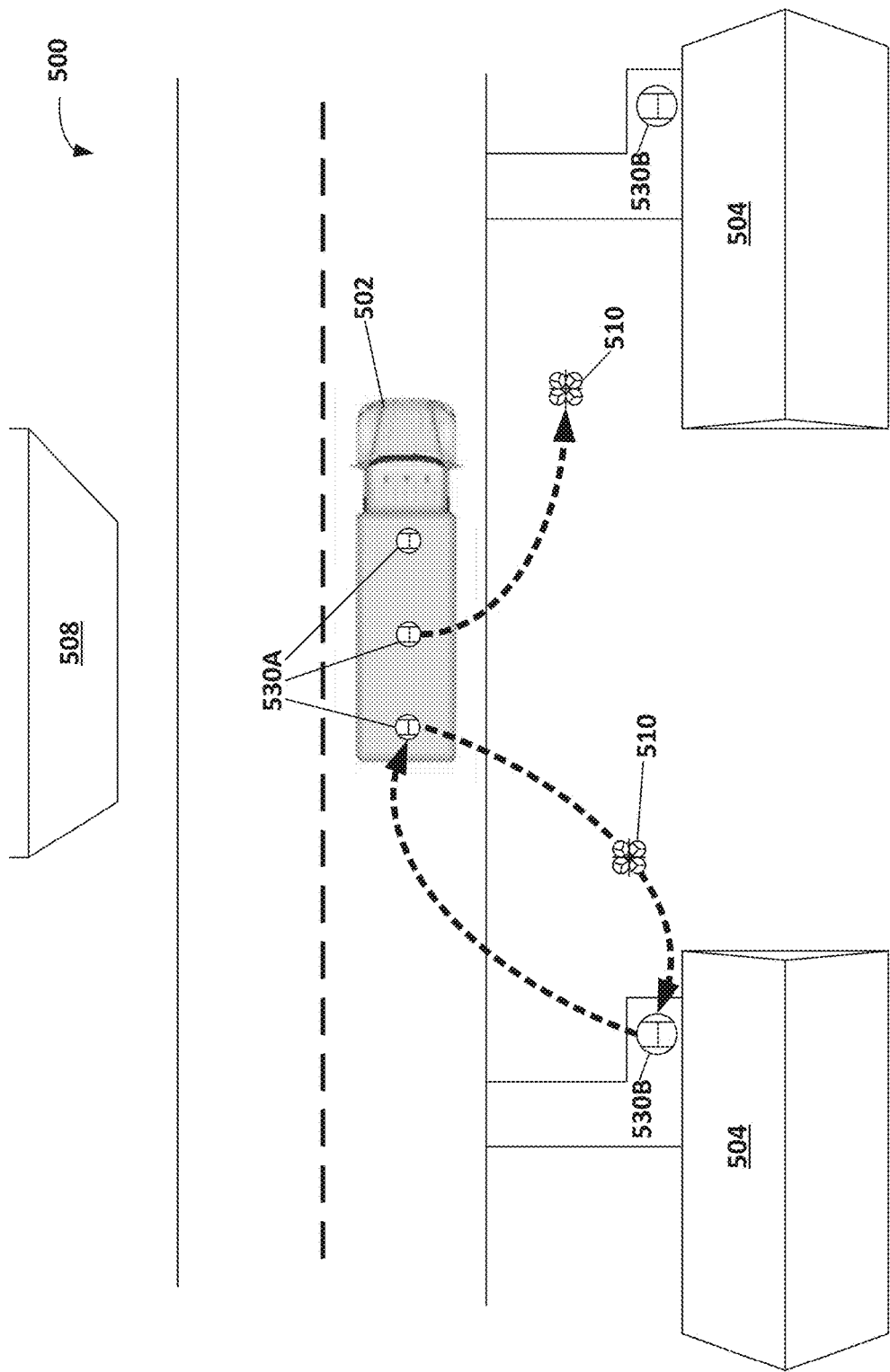
FIG. 5 is a conceptual diagram of an example delivery system, in accordance with the techniques of this disclosure.

FIG. 5 is a conceptual diagram of an example delivery system 500, in accordance with techniques of this disclosure. Delivery system 500 may implement the techniques of system 100 of FIGS. 1 and 2, respectively. Although depicted in FIG. 5 as a delivery system, the techniques of FIG. 5 may similarly be applicable to UAVS of a surveillance system, an emergency medical system, or any other system where a human UAV pilot is a limited resource.

Delivery system 500 includes a delivery vehicle 502. Delivery vehicle 502 may be a delivery truck or mail truck configured to store a large number of packages or other deliverables, such as newspapers, medicine, groceries, or the like. Delivery vehicle 502 includes one or more UAV landing pads 530A. For example, landing pads 530A may be rigidly coupled to an exterior roof or an interior surface of delivery vehicle 502. Each landing pad includes an embedded omnidirectional antenna and/or an embedded directional antenna.

Delivery system 500 includes one or more dwellings 504. Each dwelling 504 may include a residence, such as a house or apartment building, an office, a store, or any other structure having a unique mailing address. Each dwelling 504 includes a fixed landing pad 530B. For example, each fixed landing pad 530B may be located on a front porch, a back deck, near a mailbox, or any other easily accessible location within the boundaries of dwelling 504. Each fixed landing pad 530B may include an embedded omnidirectional antenna and/or an embedded directional antenna.

In accordance with the techniques of system 100 of FIGS. 1 and 2, delivery system 500 includes one or more unmanned aerial vehicles 510 configured to automatically self-navigate between landing pads 530A and landing pads 530B in order to deliver goods from delivery vehicle 502 to residences 504. For example, UAVs 510 may be initially located on landing pads 530A of delivery vehicle 502. Using a combination of unique identifiers, time-of-flight (ToF) and received signal strength indication (RSSI), UAVs 510 may determine a distance and a direction, respectively, in order to automatically self-navigate toward landing pads 530B. Upon reaching an intended landing pad 530B. UAV 510 may automatically release a package onto the landing pad, and then, using similar techniques, self-navigate back toward landing pads 530A on delivery vehicle 502. In other examples of delivery system 500, rather than deploying from delivery vehicle 502, UAVs 510 may deploy directly from a distribution center 508, such as a post office or other origin of the deliverables.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. An unmanned aerial vehicle (UAV) navigation system comprising:
    a portable, ground-based landing pad comprising:
        a first antenna; and
        first processing circuitry configured to cause the first antenna to transmit a data packet in response to determining that the UAV has lost a data communication with a controller, wherein the data communication comprises at least one of telemetry data, a navigation signal, a control signal, or a GPS signal, wherein the data packet comprises a time stamp and an identification number for the landing pad;
    a UAV comprising:
        a second antenna configured to receive the data packet; and
        second processing circuitry configured to:
            determine a signal strength between the first antenna and the second antenna;
            determine, based on the signal strength, an orientation of the UAV relative to the landing pad; and
            determine, based on a time of flight of the data packet, a distance between the UAV and the landing pad.

2. The system of claim 1, wherein the second processing circuitry is configured to determine the signal strength between the first antenna and the second antenna by causing the UAV to rotate to determine an orientation of the second antenna corresponding to a highest signal strength.

3. The system of claim 1, wherein the second processing circuitry is configured to determine the signal strength between the first antenna and the second antenna by causing the second antenna to rotate with respect to the UAV to determine an orientation of the second antenna corresponding to a highest signal strength.

4. The system of claim 1, wherein, based on the orientation and the time of flight, the second processing circuitry is further configured to cause the UAV to navigate toward the landing pad.

5. The system of claim 1, wherein the first antenna comprises an omnidirectional Long-Range (LoRa) antenna.

6. The system of claim 1, wherein the second antenna comprises a Yagi-Uda directional antenna.

7. The system of claim 1, wherein the first processing circuitry is configured to cause the first antenna to transmit the data packet in response to receiving user input.

8. The system of claim 1, wherein the landing pad comprises a planar mat rated at least IP66.

9. An unmanned aerial vehicle (UAV) comprising:
an antenna, and
processing circuitry configured to:
receive, from a ground-based portable landing pad, a first data packet comprising a time stamp and an identification number for the landing pad;
transmit, in response to receiving the first data packet and based on a determination that the UAV has lost a data communication with a controller, a second data packet to the landing pad;
receive, from the landing pad, a third data packet comprising a distance between the UAV and the landing pad; and
cause the UAV to navigate toward the landing pad based on the distance and an orientation of the UAV relative to the landing pad.

10. The UAV of claim 9, wherein the processing circuitry is further configured to determine, based on a signal strength of the first data packet, the orientation of the UAV relative to the landing pad.

11. The UAV of claim 10, wherein the processing circuitry is configured to determine the orientation by causing the UAV to rotate and determining the signal strength of the first data packet at a plurality of orientations during the rotation.

12. The UAV of claim 10, wherein the processing circuitry is configured to determine the orientation by causing the antenna to rotate and determining the signal strength of the first data packet at a plurality of orientations during the rotation.

13. The UAV of claim 9, wherein the third data packet further comprises the orientation of the UAV relative to the landing pad.

14. A method comprising:
receiving, by a UAV from a ground-based portable landing pad, a first data packet comprising a time stamp and an identification number for the landing pad;
transmitting, by the UAV in response to receiving the first data packet and based on a determination by the UAV that the UAV has lost a data communication with a controller, a second data packet to the landing pad;
receiving, by the UAV from the landing pad, a third data packet comprising a distance between the UAV and the landing pad; and
causing the UAV to navigate toward the landing pad based on the distance and an orientation of the UAV relative to the landing pad.

15. The method of claim 14, further comprising determining, by the UAV based on a signal strength of the first data packet, the orientation of the UAV relative to the landing pad.

16. The method of claim 15, wherein determining the orientation comprises causing the UAV to rotate and determining the signal strength of the first data packet at a plurality of orientations during the rotation.

17. The method of claim 15, wherein determining the orientation comprises:
causing a directional antenna to rotate; and
determining the signal strength of the first data packet at a plurality of orientations during the rotation.

18. The method of claim 14, wherein the third data packet further comprises the orientation of the UAV relative to the landing pad.

* * * * *